US010085227B2

(12) United States Patent
Huang

(10) Patent No.: US 10,085,227 B2
(45) Date of Patent: Sep. 25, 2018

(54) MAINTAINING UPLINK SYNCHRONIZATION

(71) Applicant: Empire Technology Development LLC, Wilmington, DE (US)

(72) Inventor: Anpeng Huang, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/763,919

(22) PCT Filed: Jan. 28, 2013

(86) PCT No.: PCT/CN2013/071036
§ 371 (c)(1),
(2) Date: Jul. 28, 2015

(87) PCT Pub. No.: WO2014/113995
PCT Pub. Date: Jul. 31, 2014

(65) Prior Publication Data
US 2015/0373659 A1 Dec. 24, 2015

(51) Int. Cl.
*H04W 72/12* (2009.01)
*H04W 56/00* (2009.01)
*H04W 74/08* (2009.01)
*H04L 1/18* (2006.01)

(52) U.S. Cl.
CPC ....... *H04W 56/0045* (2013.01); *H04L 1/1812* (2013.01); *H04W 72/1278* (2013.01); *H04W 74/08* (2013.01)

(58) Field of Classification Search
CPC ............. H04W 56/00; H04W 72/1278; H04W 56/0005; H04W 74/08
See application file for complete search history.

(56) References Cited

U.S. PATENT DOCUMENTS

| | | | | |
|---|---|---|---|---|
| 8,442,027 B2* | 5/2013 | Harada | ................. | H04L 1/1812 370/350 |
| 8,983,396 B2* | 3/2015 | Nukala | ............. | H04W 56/0005 455/517 |
| 9,042,925 B2* | 5/2015 | Seo | ....................... | H04W 56/00 455/408 |
| 9,137,765 B2* | 9/2015 | Lindstrom | ........ | H04W 56/0005 |

(Continued)

FOREIGN PATENT DOCUMENTS

| CN | 101841905 A | 9/2010 |
|---|---|---|
| CN | 102227939 A | 10/2011 |
| EP | 2086258 A1 | 8/2009 |

OTHER PUBLICATIONS

3GPP TS 36.211 "3rd Generation Partnership Project; Technical Specification Group Radio Access Network; Evolved Universal Terrestrial Radio Access (E-UTRA); Physical Channels and Modulation" 85 pages. (Mar. 2010).

(Continued)

*Primary Examiner* — Raj K Jain

(57) ABSTRACT

In an LTE system, to maintain synchronization between different user equipment, a base station may consider one or more factors including the delay in transferring a timing advance command, an amount of time for the user equipment to process the timing advance command, and a period of time for repeated retransmissions of the timing advance command.

7 Claims, 6 Drawing Sheets

(56) References Cited

U.S. PATENT DOCUMENTS

| | | | |
|---|---|---|---|
| 2012/0064931 A1 | 3/2012 | Hamada | |
| 2013/0336268 A1* | 12/2013 | Better | H04W 56/0005 370/329 |
| 2014/0177449 A1* | 6/2014 | Novak | H04W 4/008 370/241 |
| 2014/0226629 A1* | 8/2014 | Kim | H04W 36/0016 370/331 |
| 2014/0362832 A1* | 12/2014 | Rudolf | H04L 1/1822 370/336 |
| 2015/0373659 A1* | 12/2015 | Huang | H04L 1/1812 370/338 |

OTHER PUBLICATIONS

3GPP TS 36.213 "3rd Generation Partnership Project; Technical Specification Group Radio Access Network; Evolved Universal Terrestrial Radio Access (E-UTRA); Physical layer procedures," 79 pages (Oct. 2009)
3GPP TS 36.331 "3rd Generation Partnership Project; Technical Specification Group Radio Access Network; Evolved Universal Terrestrial Radio Access (E-UTRA); Radio Resource Control (RRC)" 250 pages (Jun. 2010)
3GPP TS 36.321 "3rd Generation Partnership Project; Technical Specification Group Radio Access Network; Evolved Universal Terrestrial Radio Access (E-UTRA); Medium Access Control (MAC) protocol specification" 48 pages (Jun. 2010).
International Search Report and Written Opinion dated Nov. 7, 2013 for international application No. PCT/CN2013/071036, filed on Jan. 28, 2013

\* cited by examiner

MAINTAINING UPLINK SYNCHRONIZATION

CROSS-REFERENCE TO RELATED APPLICATION

This Application is the U.S. National Stage filing under 35 U.S.C § 371 of International Application No. PCT/CN2013/071036, filed on Jan. 28, 2013. The disclosure of International Application No. PCT/CN2013/071036 is hereby incorporated by reference in its entirety.

TECHNICAL FIELD

The embodiments described herein pertain generally to maintaining uplink synchronization in a Long Term Evolution (LTE) system.

BACKGROUND

In an LTE system, user equipment within a cell may correctly transmit uplink data and respond to downlink data when receiving clocks of all user equipment within the cell are synchronized.

SUMMARY

In one example embodiment, a method may include starting a timer configured to control timing of transmission of timing advance commands from a first wireless communication device to a second wireless communication device, determining an amount of advance transmission time, adjusting the timer to transmit a first timing advance command (TAC) earlier by the determined amount of advance transmission time, and transmitting the first TAC from the first wireless communication device to the second wireless communication device, in accordance with the adjusted timer.

In another example embodiment, a method may include starting a timer that expires after a predetermined amount of time; receiving, before the timer expires, a first timing advance command (TAC) from a first wireless communication device at a time that precedes a scheduled transmission time by a predetermined amount of advance transmission time; and adjusting the timer based on one or more parameters included in the first TAC.

In yet another example embodiment, a computer-readable medium stores instructions that, when executed, may cause one or more processors to perform operations including determining an amount of advance transmission time based on one or more of parameters including a transmission time for a first timing advance command (TAC) to be transmitted from a first wireless communication device to a second wireless communication device, a processing time for the first wireless communication device to process the first TAC, and a retransmission time for hybrid automatic repeat request (HARQ) retransmissions; and transmitting the first TAC, from the first wireless communication device to the second wireless communication device, at a time that is earlier than an original transmission time by the determined amount of advance transmission time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
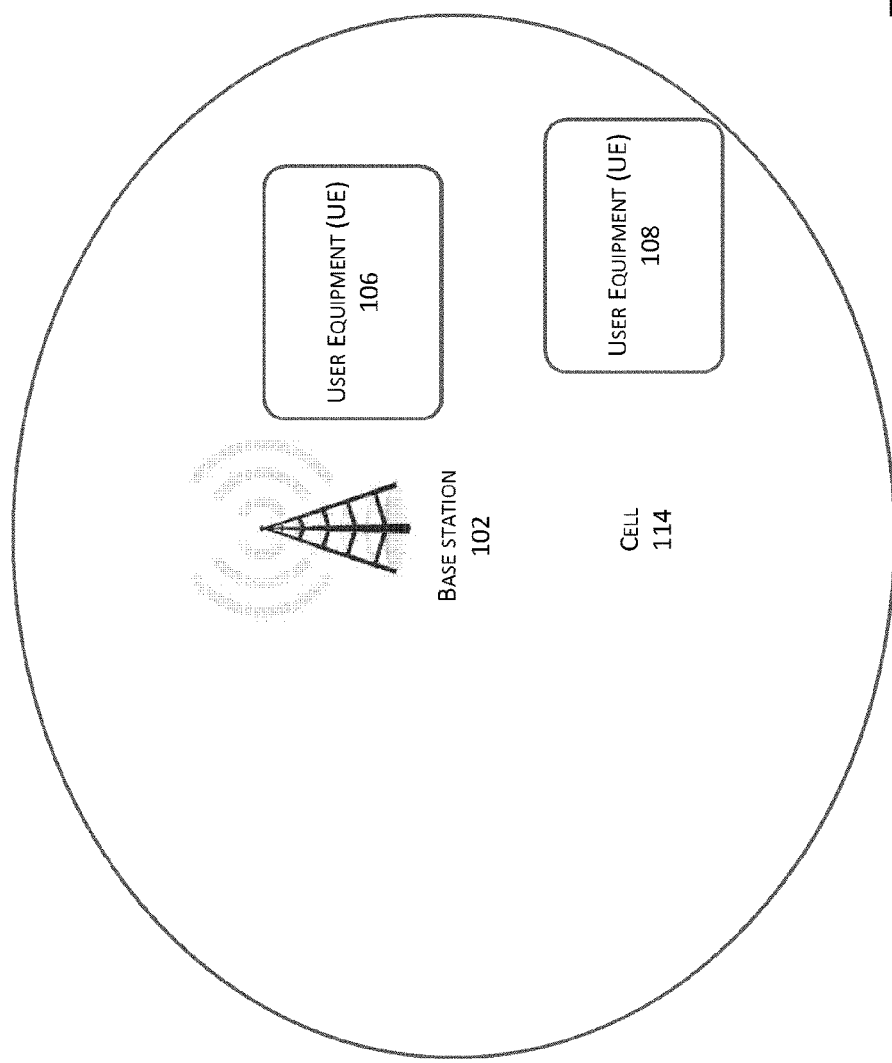
FIG. 1 shows an example wireless communication system in which one or more embodiments of maintaining uplink synchronization may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example wireless communication system 100 in which one or more embodiments of maintaining uplink synchronization may be implemented, arranged in accordance with at least some embodiments described herein. As depicted, wireless communication system 100 includes, at least, a base station 102 within a cell 114, a user equipment (UE) 106, and a user equipment (UE) 108.

Base station 102 may be installed at a fixed location or a mobile base. The effective communication coverage of base station may define the boundaries of cell 114. Further, base station 102 may transmit wireless signals to and from UE 106 when UE 106 is located within cell 114. For example, cell 114 may refer to a range of radio coverage in a respective cellular network. Base station 102, within the boundaries of cell 114, may be configured to provide wireless communication for user equipment therein.

Base station 102 may be configured to support wireless communication between one or more embodiments of user equipment located within a corresponding cell, e.g., UE 106. Such communication may be in accordance with different wireless communication standards including Time Division Duplexing Long Term Evolution (TDD-LTE), Frequency Division Duplexing FDD-LTE, IEEE 802.15.4, Global System for Mobile Communications (GSM), Code Division Multiple Access (CDMA) and etc., which may further determine a work mode of the respective wireless communication devices. The work modes may include time division duplexing mode and frequency division duplexing mode. Such examples are not intended to be limiting, and therefore should not be interpreted to be so. In an LTE system, base station 102 may be referred as an Evolved Node B (eNB).

UE 106 and UE 108 may refer to a mobile (or portable) electronic devices such as a mobile phone, smartphone, personal digital assistant (PDA) a personal media player device, an application specific device, or a hybrid device that includes any of the above functions. Alternatively, UE 106 and UE 108 may be implemented as a personal computer including tablet, laptop computer, non-laptop computer configure configurations, etc. User equipment within a working range of base station 102 may reliably communicate with, i.e., transmit signals to and receive signals from, base station 102. Unless a distinction between the devices is needed, the devices may be alternatively, and collectively, referred to as "UE 106/108."

In an example embodiment, UE 106/108 may facilitate uplink communications utilizing Single-Carrier Frequency-Division Multiple Access (SC-FDMA) technologies. In an LTE system based on SC-FDMA technology, a communication between UE 106 and base station (eNB) 102 may cause interference in a communication between UE 106 and UE 108. In order to minimize such interference between UE 106 and UE 108, base station 102 may be configured to manage or handle a transmission timing of UE 106 and the other embodiment thereof. That is, base station 102 may be configured to synchronize the transmission signals of UE 106 and UE 108 and to further ensure that the transmission signals from different user equipment may arrive at base station 102 at the same time by delaying or advancing the transmission timing of each UE. For example, the communication between base station 102 and UE 108 may cause interference in the communication between base station 102 and UE 106 if the transmission signals are not synchronized. Base station 102 may then maintain a timer to adjust the transmission timing of each embodiment of user equipment (e.g., UE 106 and UE 108) within cell 114 to compensate for the time difference in transmitting signals corresponding to each embodiment of user equipment. The time difference in transmitting signals may be caused by, e.g., different data transmission time of the signals from different user equipment at different locations, differing performance by different embodiments of user equipment, and a number of repeats in transmitting signals in communicating with different user equipment.

The data transmission time may be regarded as traveling time for data, for example, from UE 106 to base station 102, and may vary depending on a location of UE 106 relative to base station 102 within cell 114. That is, data transmission time for UE 106 located at an outer edge of cell 114 may be noticeably longer than data transmission time for at least one other UE embodiment that is located near the center of cell 114, closer to base station 102. In accordance with at least one example embodiment, base station 102 may be configured to synchronize transmitted signals from UE 106 and UE 108 based on various data transmission time so that transmission signals from the one or more embodiments of UE 106 may arrive at base station 102 at the same time.

Thus, FIG. 1 shows an example wireless communication system in which one or more embodiments of maintaining uplink synchronization may be implemented.

Figure 2:
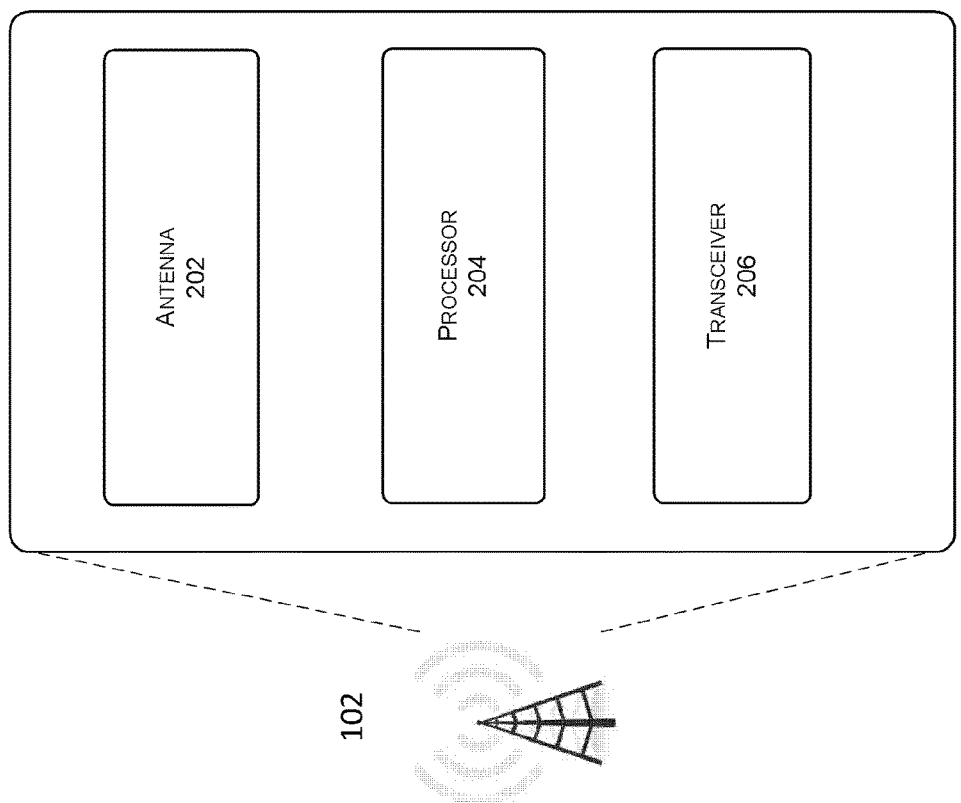
FIG. 2 shows an example base station by which one or more embodiments of maintaining uplink synchronization may be implemented, arranged in accordance with at least some embodiments described herein.

FIG. 2 shows an example base station 102 in which one or more embodiments of maintaining uplink synchronization may be implemented, arranged in accordance with at least some embodiments described herein. As depicted, base station 102 may include an antenna 202, a processor 204, and a transceiver 206.

Antenna 202 may refer to a component or module, implemented as software, hardware, firmware, or any combination thereof, that may be configured to convert electric power into electromagnetic waves, and vice versa, and then to transmit signals for wireless communication. When transmitting radio signals, antenna 202 may radiate energy from an oscillating radio frequency electric current as electromagnetic waves. When receiving radio signals from a communication device within a respective cell or from another base station corresponding to a different cell, antenna 202 may intercept some of the power of electromagnetic waves to produce a relatively lower voltage at its terminals, at which the intercepted power may be further amplified.

Processor 204 may refer to a component or module that may be configured to synchronize signals received via antenna 202 from UE 106 and one or more embodiments of UE 106 in cell 114 and to further ensure that transmission signals from UE 106 and UE 108 arrives at base station 102 at the same time so that UE 106 and UE 108 may each transmit uplink data and respond to downlink data correctly. In accordance with at least one example embodiment, in an LTE system adopting SC-FDMA technology for uplink communications, signals from UE 106 UE 108) may be synchronized by processor 204 by adjusting the transmission timing of the signals from different UE, via a Timing Advance Command (TAC), in maintaining different time alignment to compensate uplink signals transmission delay that may be caused by factors including the travelling time of the signals from different user equipment at different locations, the time to process commands due to difference performances of different user equipment, and a number of repeats in transmitting signals in communicating with different user equipment. For example, since UE 106 is located closer to base station 102 than UE 108, the transmitted signal from UE 106 may arrive at base station 102 earlier than the signals from UE 108. The unsynchronized signals may then cause interferences to each other. Processor 204 may then delay the transmission timing of UE 106 or advance the transmission timing of UE 108 to synchronize the transmission signals. A TAC may refer to a command, from processor 204 to a UE, indicating that the UE may reset a timer maintained by processor 204 and the UE together.

In accordance with at least one example embodiment, processor 204 may be configured to adjust or manage a transmission timing of UE 106 upon each UE's position and processing capability, and such adjustment may be referred as the timing alignment maintenance. To maintain the timing alignment, base station 102 may be configured to receive a first signal, which may be referred to as a random access preamble, transmitted from UE 106; and processor 204 may then calculate a time alignment value using the received random access preamble. The time alignment value is utilized to adjust (i.e., faster or slower) a data transmission timing of UE 106. The calculated time alignment value may be notified, by processor 204, to UE 106 by a second signal, which may be referred to as a random access response; and UE 106 may update the data transmission timing based on the calculated time alignment value.

Transceiver 206 may refer to a component or module that may be configured to transform digital or analog signals into a radio frequency electric current, during transmission thereof. When signals are received at base station 102/104, transceiver 206 may be configured to transform the low voltage on terminals of antenna 202 into digital or analog signals.

Thus, FIG. 2 shows an example base station 102 in which one or more embodiments of maintaining uplink synchronization may be implemented.

Figure 3:
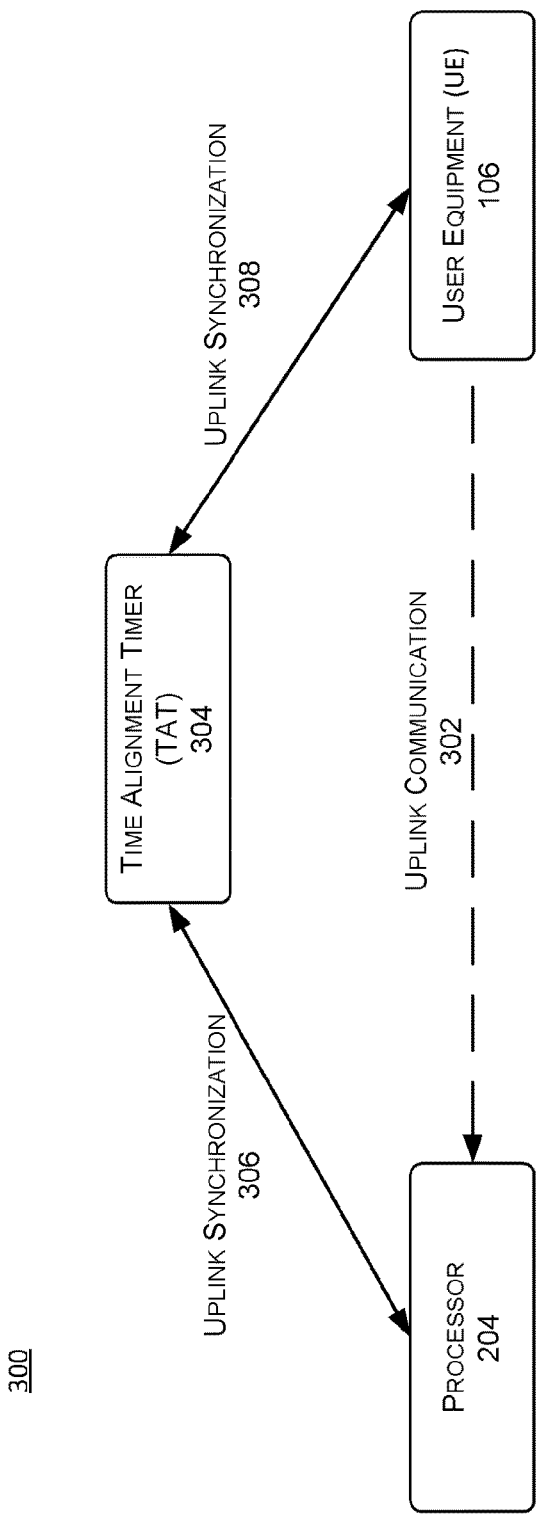
FIG. 3 shows an example configuration of uplink communication structure by which one or more embodiments of maintaining uplink synchronization may be implemented, arranged in accordance with at least some embodiments described herein.

FIG. 3 shows an example configuration of uplink communication structure 300 by which one or more embodiments of maintaining uplink synchronization may be implemented, arranged in accordance with at least some embodiments described herein. As depicted, uplink communication structure 300 may include, at least, a time alignment timer (TAT) 304 maintained by processor 204 and UE 106, an uplink synchronization 306, an uplink synchronization 308, and an uplink communication 302.

Uplink communication 302 may refer to a data stream carrying transmitted information from UE 106 to Processor 204 via antenna 202. Respective implementations of communication 302 may be transmitted in accordance with different wireless communication standards including Time Division Duplexing Long Term Evolution (TDD-LTE), Frequency Division Duplexing FDD-LTE, IEEE 802.15.4, GSM, CDMA etc.

Time Alignment Timer (TAT) 304 may refer to a component or module that may be configured to indicate or represent a time duration indicating the length of the validity period of a timing advance command from base station 102 to UE 106. In accordance with at least some example embodiments, in an LTE system adopting SC-FDMA technology for its uplink communication, UE 106 within cell 114 may not camp at a fixed location and, therefore, the transmission timing of each UE may be frequently changed based on movement of UE 106 and velocity of such movement. When UE 106 receives a timing advance command adjusting the time difference in transmission timing (i.e., delaying or advancing the transmission) from base station 102, the timing advance command may be valid only for a time duration due to the frequent changing of UE's position since UE 106 may move to another location after a short period of time and the time difference in transmitting signals that needs to be compensated may be changed soon after. TAT 304 may be configured to indicate or represent the time duration indicating the length of the validity period of a timing advance command. Processor 204 and UE 106 each has access to TAT 304.

Uplink synchronization 308/306 may refer to a command to start or reset TAT 304. As mentioned above, in accordance with at least some example embodiments, base station 102 may transmit a time alignment command to UE 106 for maintain TAT 304. Upon receiving the time alignment command, UE 106 may reset TAT 304, utilizing uplink synchronization 308. The value by which TAT is to be reset may be received via uplink synchronization 308 through a Radio Resource Control (RRC) or a radio bearer reconfiguration command. Processor 204, having access to TAT 304 via uplink synchronization 306, may start TAT 304, and may further reset the value of TAT 304 by transmitting a new time alignment command to UE 106 during the operation of TAT 304 (i.e., the timing advance command is still valid).

Thus, FIG. 3 shows an example configuration of uplink communication structure 300 by which one or more embodiments of maintaining uplink synchronization may be implemented.

Figure 4:
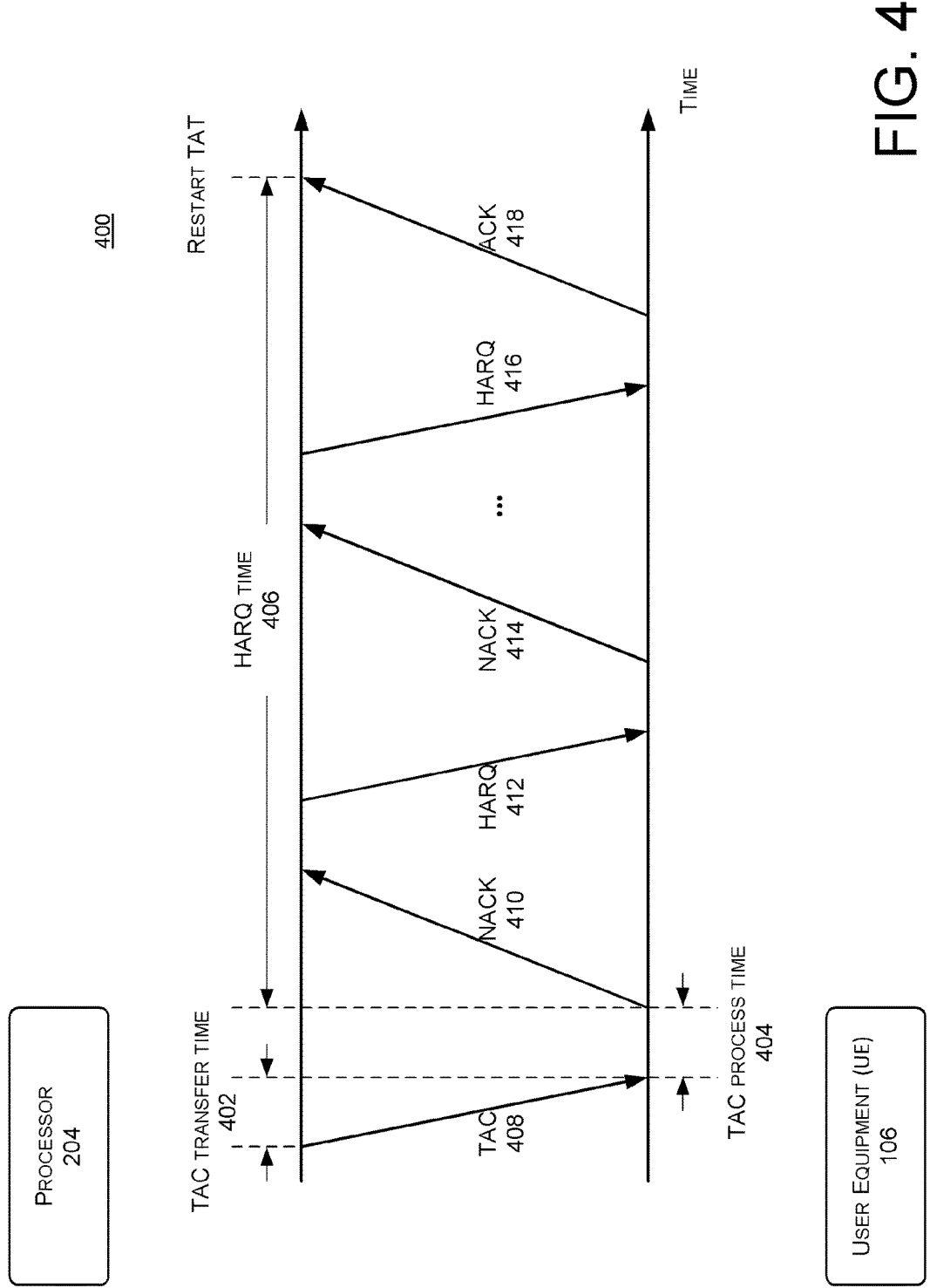
FIG. 4 shows an example synchronizing process by which one or more embodiments of maintaining uplink synchronization may be implemented, arranged in accordance with at least some embodiments described herein.

FIG. 4 shows an example synchronizing process 400 by which one or more embodiments of maintaining uplink synchronization may be implemented, arranged in accordance with at least some embodiments described herein. As depicted, example synchronizing process 400, at least, includes a TAC transfer time 402 indicating a period of time required to transfer a time alignment command (TAC) 408, a TAC process time 404 indicating a period of time required for UE 106 to process TAC 408, a HARD time indicating a summed period of time of receiving, transferring, and processing a non-acknowledgement signal (NACK) 410, a hybrid automatic repeat request (HARQ) 412, another NACK 414, another HARQ 416, and an acknowledgement signal (ACK) 418.

TAC 408 may refer to a command notifying UE 106 to start or reset TAT 304. Upon receiving TAC 408, UE 106 may reset TAT 304.

TAC transfer time 402 may refer to a value indicating a period of time required to transfer TAC 408 from base station 102 to UE 106. In an LTE system, TAC transfer time 402 may refer to a Transmission Time Interval (TTI), which is standardized as 1 millisecond. However, the embodiments described herein are not so limited, and may be implemented utilizing varying TTI.

TAC process time 404 may refer to a period of time required for UE 106 to process TAC 408. The processing may include decompressing, decoding, or other further processes to extract information from TAC 108. TAC process time 404 may be influenced by a number of factors including the processing capabilities of a processor corresponding to UE 106 and/or a memory size corresponding to UE 106.

HARQ time 406 may refer to a period of time for multiple transmissions of TAC 408 from base station 102 to UE 106. In an LTE system, when UE 106 successfully receives TAC 408 from base station 102, UE 106 may reply with an Acknowledgement (e.g., ACK 418) and may further start or reset TAT 304. If UE 106 fails to receive TAC 408 before the time duration in TAT 304 expires, UE 106 may submit a Non-acknowledgement signal (e.g., NACK 410, NACK 414) to processor 204 to request processor 204 to retransmit TAC 408 via a Hybrid Automatic Repeat Request (e.g., HARQ 412, HARQ 416). In at least one example embodiment, when UE 106 fails to correctly receive TAC 408, processor 204 may repeatedly retransmit HARQs until UE 106 successfully receives TAC 408 or the time duration in TAT 304 expires. The repeated retransmission of HARQs may be preset up to a maximum number. HARQ time 406 may refer to a product of the maximum number of HARQ retransmission (e.g., preset as N) and an amount of time between two consecutive HARQ retransmissions (RTT). Depending on a sub-frame slot used for the HARQ retransmission, the retransmission time for HARQ (e.g., HARQ time 406) may vary. For example, HARQ time may be different in a FDD-LTE system and in a TDD-LTE system. In a FDD-LTE system, a RTT may be 8 millisecond when, in a TDD-LTE system, a RTT may be determined by the configuration of uplink and downlink communications and the sub-frame adopted by the corresponding communication. When the time duration in TAT 304 expires, UE 106 may assume that uplink synchronization is failed and may not continue to communicate with base station 102. All resources for uplink communication 302 may be released.

In accordance with at least one example embodiment, in an LTE system, processor 204 may start to transmit TAC 408 at an amount of time prior to the time duration indicated by TAT 304. As aforementioned, the time duration indicated by TAT 304 may represent the length of validity period of a time alignment command. The amount of time may refer to a sum of TAC transfer time 402, TAC process time 404, and HARQ time 406. Taking possible failures in receiving TAC 408 into consideration, transmitting TAC 408 in advance may ensure UE 106 to receive TAC 408 before the time duration indicated by TAT 204 expires even in the case that the retransmission has reached the preset maximum number.

Thus, FIG. 4 shows an example synchronizing process 400 by which one or more embodiments of maintaining uplink synchronization may be implemented.

Figure 5:
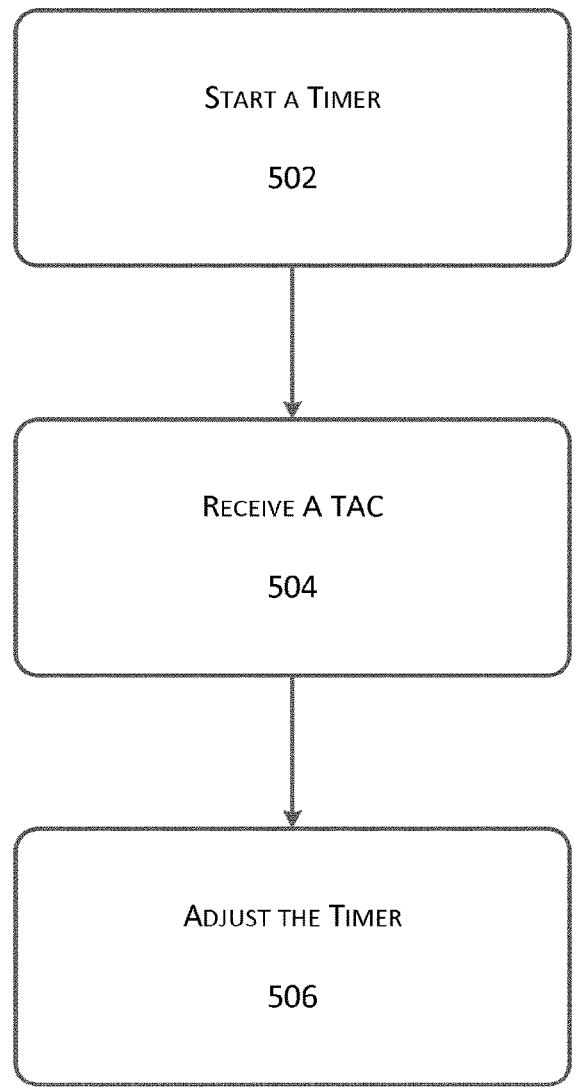
FIG. 5 shows an example configuration of a processing flow of operations by which embodiments of maintaining uplink synchronization may be implemented, arranged in accordance with at least some embodiments described herein.

FIG. 5 shows an example configuration of a processing flow of operations for which embodiments of maintaining uplink synchronization may be implemented, arranged in accordance with at least some embodiments described herein. As depicted, processing flow 500 may include sub-processes executed by various components that are part of wireless communication system 100. However, processing flow 500 is not limited to such components, as obvious modification may be made by re-ordering two or more of the sub-processes described here, eliminating at least one of the sub-processes, adding further sub-processes, substituting components, or even having various components assuming sub-processing roles accorded to other components in the following description. Processing flow 500 may include various operations, functions, or actions as illustrated by one or more of blocks 502, 504, and/or 506. Processing may begin at block 502.

Block 502 (Start a timer) may refer to processor 204 starting a TAT 304 that expires after a predetermined amount of time. In accordance with at least some example embodiments, in an LTE system adopting SC-FDMA technology for its uplink communication, UE 106 within cell 114 may not camp on a fixed location and, therefore, the transmission timing of UE 106 may be frequently changed based on movement of UE 1 and velocity of such movement. When UE 106 receives a timing advance command from base station 102, the timing advance command may be valid only for the predetermined amount of time due to the frequently changing position of UE 106. The predetermined amount of time may be indicated or represented by TAT 304. Processing may continue from block 502 to 504.

Block 504 (Receive a timing advance command (TAC)) may refer to UE 106 receiving, before the predetermined amount of time in TAT 304 expires, a TAC (e.g., TAC 408) from base station 102, or some other wireless communication device, in advance of a scheduled transmission time by a predetermined amount of time.

In accordance with at least one example embodiment, base station 102 may transmit TAC 408 to UE 106 at a scheduled time. Due to factors including delay on transmitting TAC 408, time for processing TAC 408, and/or repeated retransmissions of TAC 408, the predetermined amount of time in TAT 304 may expire (i.e., the timing advance command is not valid any longer) when UE 106 receives TAC 408. Processor 204 may transmit TAC 408 in advance of the scheduled transmission time by a predetermined amount of time to compensate for the factors that cause the delay in successfully receiving TAC 408. The predetermined amount of advance time may be a combination of a transmission time for TAC 408 from processor 204 to UE 106, a processing time for UE 106 to process TAC 408, and a retransmission time for HARQ retransmissions. For example, the time may refer to a sum of TAC transfer time 402, TAC process time 404, and HARQ time 406. Processing may continue from block 504 to 506.

Block 506 (Adjust the Timer) may refer to UE 106 adjusting the timer (e.g., TAT 304) based on one or more parameters included in the TAC (e.g., TAC 408). In at least one example embodiment, TAC 408 may indicate a command, from processor 204 to a UE, indicating that the UE may start or reset a timer maintained by processor 204 and the UE together (e.g., TAT 304).

Thus, FIG. 5 shows an example configuration of a processing flow of operations for which embodiments of maintaining uplink synchronization may be implemented.

Figure 6:
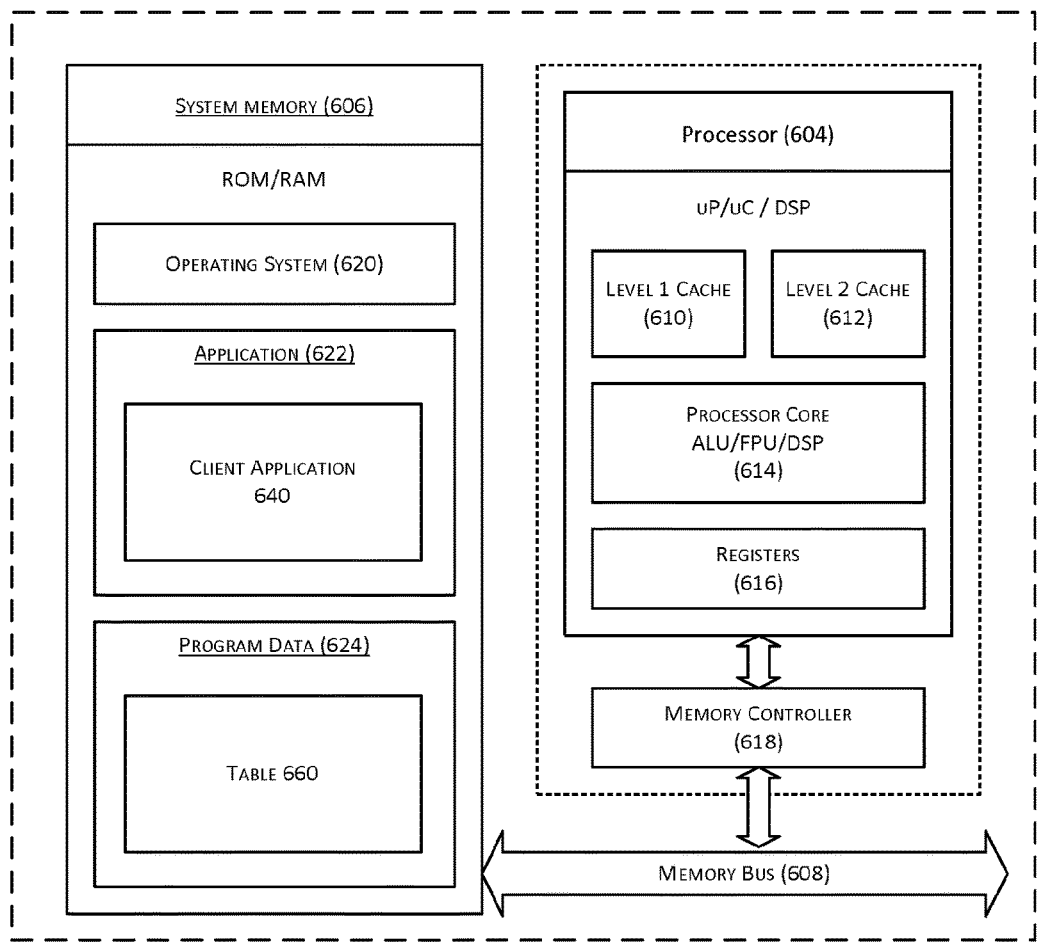
FIG. 6 shows a block diagram illustrating an example computing device by which various example solutions described herein may be implemented, arranged in accordance with at least some embodiments described herein.

FIG. 6 shows a block diagram illustrating an example computing device by which various example solutions described herein may be implemented, arranged in accordance with at least some embodiments described herein.

More particularly, FIG. 6 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the example wireless communication system.

In a very basic configuration, a computing device 600 may typically include one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. The processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may include a client application 640, which may be configured to maintain uplink synchronization as described previously with respect to FIGS. 1-5. Program data 624 may include a table 660, which may be useful for implementing actuation of appropriate components or modules as described herein.

System memory 606 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for wireless communication system 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method, comprising:
    starting a timer configured to control timing of transmission of timing advance commands from a first wireless communication device to a second wireless communication device;
    determining an amount of advance transmission time to transmit a first timing advance command (TAC), wherein the amount of advance transmission time includes a transmission time for the first TAC to be transmitted from the first wireless communication device to the second wireless communication device, a processing time for the second wireless communication device to process the first TAC, and a retransmission time for hybrid automatic repeat request (HARQ) retransmissions;
    adjusting the timer to transmit the first TAC earlier by the determined amount of advance transmission time; and
    transmitting the first TAC from the first wireless communication device to the second wireless communication device, in accordance with the adjusted timer, wherein the transmitting the first TAC from the first wireless communication device to the second wireless communication device precedes a scheduled transmission time of the TAC by the determined amount of advance transmission time.

2. The method as recited in claim 1, wherein the retransmission time for HARQ retransmissions is proportional to a maximum number of HARQ retransmissions and an amount of time between two consecutive HARQ retransmissions.

3. The method as recited in claim 1, wherein the retransmission time for HARQ retransmissions varies based on a sub-frame timeslot used for the HARQ retransmissions.

4. The method as recited in claim 1, wherein the first wireless communication device includes a base station, and wherein the second wireless communication device includes a user device in a long term evolution (LTE) network.

5. A non-transitory computer-readable medium having instructions stored thereon that, in response to execution by one or more processors, cause the one or more processors to perform or control performance of operations comprising:
    start a timer configured to control timing of transmission of timing advance commands from a first wireless communication device to a second wireless communication device;
    determine an amount of advance transmission time to transmit a first timing advance command (TAC), wherein the amount of advance transmission time includes a transmission time for the first TAC to be transmitted from the first wireless communication device to the second wireless communication device, a processing time for the second wireless communication device to process the first TAC, and a retransmission time for hybrid automatic repeat request (HARQ) retransmissions;
    adjust the timer to transmit the first TAC earlier by the determined amount of advance transmission time; and
    transmit the first TAC from the first wireless communication device to the second wireless communication device, in accordance with the adjusted timer, wherein the transmission of the first TAC from the first wireless communication device to the second wireless communication device precedes a scheduled transmission time of the TAC by the determined amount of advance transmission time.

6. The computer-readable medium as recited in claim 5, wherein the retransmission time for HARQ retransmissions is proportional to a maximum number of HARQ retransmissions and an amount of time between two consecutive HARQ retransmissions.

7. The computer-readable medium as recited in claim 5, wherein the retransmission time for HARQ retransmissions varies based on a sub-frame timeslot used for the HARQ retransmissions.

* * * * *